Dec. 21, 1948.  A. R. JONES ET AL  2,456,636
COUPLING ASSEMBLY
Filed May 1, 1945
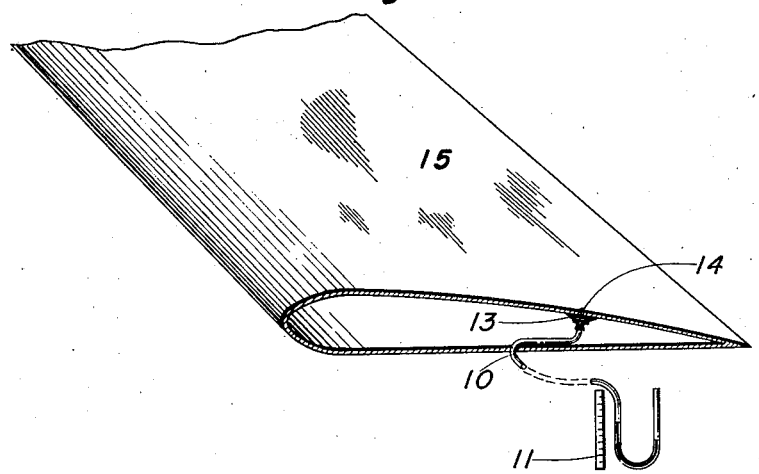
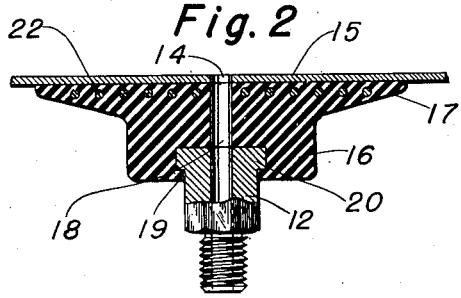
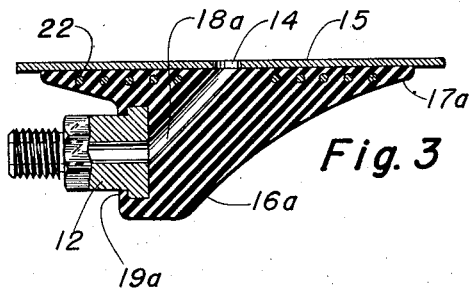
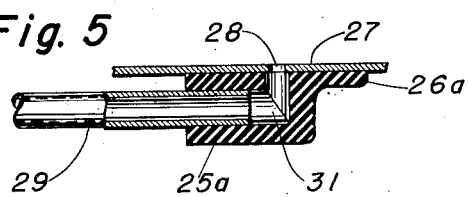
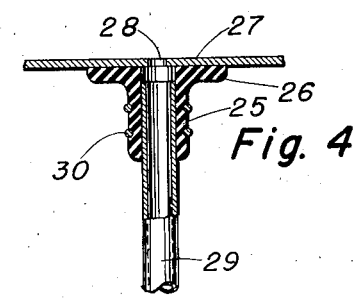
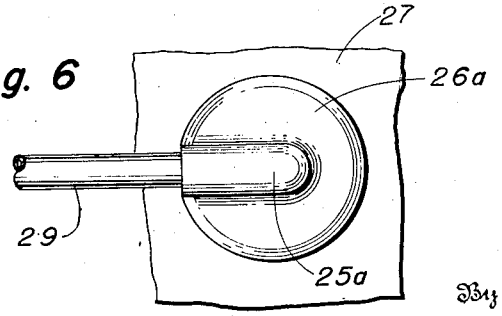
Inventors
Alun R. Jones
Bonne C. Look Jr.
By Ralph L. Chappell
Attorney Patented Dec. 21, 1948

2,456,636

UNITED STATES PATENT OFFICE 2,456,636

COUPLING ASSEMBLY

Alun R. Jones, Los Altos, and Bonne C. Look, Jr., Palo Alto, Calif.

Application May 1, 1945, Serial No. 591,296

1 Claim. (Cl. 285—25)

(Granted under the act of March 3, 1883, as amended April 30, 1928; 370 O. G. 757)

The present invention relates to new and useful improvements in a coupling for joining fluid conduits and more particularly to new and useful improvements in a coupling assembly having an adapter for connecting fluid conduits.

In general, the invention contemplates the provision of a coupling assembly which is particularly designed to simplify the connection between an apertured member, such as a wall structure or other surface having an aperture therethrough, and a tube fitting, and the adapter has a fluid passage therethrough which provides fluid communication therebetween. More specifically, the coupling assembly may be advantageously employed in aircraft installations; for instance, as a simple and strong connection between a fluid conduit connected to a static pressure measuring device and an aperture through an airfoil, nacelle, fuselage, seaplane hull or other part of an aircraft to measure pressure distributions set up at the selected points on the aircraft. The assembly may also be employed in a static-vent installation for a source of static pressure in an airspeed indicating system. Obviously, the assembly may be utilized in various other installations where it is desired to afford a simple connection between a tube and an aperture in some other member.

An object of the present invention is to provide a coupling assembly of the above type which may be installed without disturbing the surface configuration of the apertured member, such an arrangement being of particular importance in aircraft installations where it is important to maintain the original external aerodynamic shape of the aircraft.

Another object of the invention is to provide a coupling assembly of the above type wherein the adapter is adhesively secured to the apertured member.

A further objection of the invention is to provide a coupling assembly of the above type wherein the adapter is preferably made of a molded material, such as a rubber-like or plastic material.

A still further object of the invention is to provide a coupling assembly of the above type having heating means embedded in the adapter to prevent the formation of ice in and around the fluid passage.

The above and other objects of the invention will in part be obvious and will be hereinafter more fully pointed out.

In the accompanying drawing:

Fig. 1 is a schematic perspective view showing installation of the invention in the static pressure line of an airplane.

Fig. 2 is an enlarged longitudinal detail sectional view of the coupling assembly.

Fig. 3 is a similar detail sectional view showing a modified form of the invention.

Fig. 4 is a similar longitudinal sectional view showing a further modification.

Fig. 5 is a similar longitudinal sectional view showing a still further modification.

Fig. 6 is a front elevation of Fig. 5.

Referring more in detail to the accompanying drawing and particularly to Fig. 1 thereof, the coupling is diagrammatically illustrated in a typical airplane installation wherein one end of a pressure line 10 is connected to a static pressure meter 11. The opposite end of the pressure line 10 is connected to a fitting 12 which is secured to the adapter 13 in fluid communication with the pressure aperture 14 in the airfoil 15.

As shown in Fig. 2 of the accompanying drawing, the adapter 13 consists of a body portion 16 having an annular flange portion 17 at the base thereof. A fluid passage 18 extends through the adapter and affords fluid communication between the aperture 14 and the pressure line 10. The outer surface of the flange portion 17 is secured to the adjacent surface of the airfoil by a suitable cement, thus obviating the necessity of employing securing bolts extending through the airfoil and disturbing the aerodynamic outer shape thereof. Thus, no alterations to structure are necessary. The adapter is preferably formed of some molded material, such as rubber, rubber-like or plastic materials, and the outer end of the body portion thereof is recessed and provided with an inwardly extending retaining flange 19. This flange 19 overlies and snugly fits an outwardly extending flange 20 on the coupling member or fitting 12 to which the pressure line 10 is adapted to be connected. To prevent the formation of ice in and around the aperture 14, a heating wire 22 is embedded in the adapter adjacent the surface of the airfoil. The heating wire may be replaced by a conduit for conducting a heating fluid therethrough, if desired.

A slightly modified form of adapter 13a is shown in Fig. 3. In this form of the invention, the body portion 16a is shaped to hold the coupling member 12 at approximately right angles to the axis of the aperture 14 and parallel to the apertured surface. The passage 18a through the adapter extends at an acute angle to axes of the coupling and the aperture to afford communication therebetween. The flange portion 17a is similarly secured to the surface 15.

Further modifications of the invention are shown in Figs. 4, 5 and 6. Such installations are capable of general application and the use of heating means is not shown although such heating means may be employed, if desired. In Fig. 4, the adapter includes a cylindrical body portion 25 and a flange portion 26 adapted to be adhesively secured to the surface of member 27 in which an aperture 28 is in communication with the pressure existing on the outer surface of the member 27. The adapter affords a communication between the aperture and a pipe 29 which may lead to the particular device which may be employed. Reinforcing wires 30 extend around the cylindrical body portion of the adapter and serve to more firmly secure the pipe. A further modification is shown in Fig. 5 wherein the pipe 29 is disposed parallel to the member 27. The passage 31 through the adapter is angled to provide communication between the pipe and the aperture 28. In this modification, the body portion 25a is formed integral with a part of the flange 26a.

From the foregoing description, it will appear that an extremely simple, yet durable, coupling assembly is herewith provided. The assembly is light in weight and can be readily installed. Thus, after applying a cement primer, the cement is applied to the adjacent surfaces to be joined. The adapter is then properly positioned and with available cements properly selected for the particular installation, it may be hand pressed in position. There is thus provided a simple and effective connection preventing any leakage. The tube or other pipe fitting may be fitted in the adapter in any suitable manner.

While certain preferred forms of the invention and uses therefor, have been shown for purposes of illustration, it is to be clearly understood that various changes in details of construction and arrangement of parts may be made without departing from the scope of the invention as set forth in the appended claim.

The invention described herein may be manufactured and used by or for the Government of the United States of America for governmental purposes without the payment of any royalties thereon or therefor.

What we claim is:

An adapter providing a fluid connection between a port in a smooth-outersurfaced sheet material covering an airfoil and a conduit inside said airfoil, comprising a body portion of resilient material having a passage therethrough, and a flanged portion on one side thereof in the outer surface of which said passage opens at its one end, said outer surface being adapted for cementing to the inside of said sheet material so as to place said passage in communication with said port whereby the smooth outer surface is maintained free of any obstructions, said body portion having a simple hose-fitting connection at the other end of said passage adapted for attachment to said conduit.

ALUN R. JONES.
BONNE C. LOOK, Jr.

REFERENCES CITED

The following references are of record in the file of this patent:

UNITED STATES PATENTS

| Number | Name | Date |
|---|---|---|
| 1,275,149 | Gammeter | Aug. 6, 1918 |
| 1,939,204 | Conklin | Dec. 12, 1933 |
| 2,179,500 | Diehl | Nov. 14, 1939 |
| 2,387,539 | Spanel | Oct. 23, 1945 |